United States Patent Office 3,497,589
Patented Feb. 24, 1970

3,497,589
VITAMIN COMPOSITIONS
Benjamin Borenstein, Teaneck, and Frederick William Jahns, Nutley, N.J., assignors to Hoffmann-La Roche Inc., Nutley, N.J., a corporation of New Jersey
No Drawing. Continuation-in-part of application Ser. No. 391,307, Aug. 21, 1964. This application Jan. 12, 1967, Ser. No. 608,738
Int. Cl. A61k *15/00, 15/02, 15/12*
U.S. Cl. 424—31          3 Claims

ABSTRACT OF THE DISCLOSURE

Substantially odorless vitamin compositions and the use thereof in the vitamin enrichment of foodstuffs.

CROSS REFERENCE TO RELATED APPLICATION

This application is a continuation-in-part of United States patent application Ser. No. 391,307, filed Aug. 21, 1964, now abandoned.

BRIEF SUMMARY OF THE INVENTION

Vitamin-containing compositions which are substantially odorless upon storage are prepared by admixing a coated vitamin or a mixture of coated vitamins with silicon dioxide.

The compositions are useful, per se, as a source of vitamins. Additionally, they can be used in admixture with foodstuffs to enrich same.

DETAILED DESCRIPTION

A number of the oil-soluble vitamins such as vitamin A, and water-soluble vitamins such as the B group tend to develop unpleasant odors, a problem which must be overcome in order to render the vitamin-containing products acceptable for human consumption from a marketing point of view. Various techniques have been employed to try to render these vitamins odor-free, such as by coating the vitamins with a substantially water-insoluble or low water-soluble material such as waxes, glyceryl monostearate, stearic acid, gelatin, etc. These techniques often result in vitamin compositions which have an acceptable odor for most uses. However, for some purposes, such as where the vitamins are included directly in foods, the vitamins must be substantially odorless in order to meet with adequate consumer acceptance.

Compositions containing odor-forming vitamins have now been discovered which are substantially odor-free even after long storage.

One embodiment of the invention relates to compositions which include (a) a coated vitamin or coated vitamin mixture containing at least one of the following: thiamine, riboflavin, niacin, vitamin A, or a vitamin A-active material, wherein the coating is of a material having a low water solubility, e.g., a cold water solubility of less than about 1 percent, and (b) at least about 0.01, preferably from about 0.01 to about 10.0 parts by weight of silicon dioxide per part by weight of the coated vitamin material, the silicon dioxide having a particle size in the range of from about 0.010 to about 0.040 micron, an internal surface area of less than 20 percent of the total surface area, wherein the total surface area is in the range of from about 150 to about 350 sq. meters per gram, and which contains no more than about 3 percent water. The silicon dioxide can be prepared by the high temperature oxidation of $SiCl_4$. This type of silicon dioxide has been found to exhibit a remarkable ability to adsorb vitamin odors when used in the compositions of the invention, without excessive adsorption of water vapor. The above compositions can be prepared by intimately admixing ingredients (a) and (b) above, according to standard mixing techniques, such as with a planetary mixer.

The compositions of this invention are extremely well suited for use as vitamin supplements for foodstuffs. In carrying out such embodiment of the invention, the composition is added to, and admixed with, the foodstuff. In an alternate embodiment, rather than adding the pre-formed composition to the foodstuff, the composition can be produced in situ by adding the ingredients thereof, i.e., the coated vitamin or vitamin mixture and silicon dioxide, to the foodstuff and intimately mixing same therein. It has been found that the quantity of silicon dioxide required to substantially reduce or eliminate unpleasant odors from the coated vitamins is generally greater when a foodstuff is present than in compositions containing only coated vitamins and silicon dioxide. The minimum amount of silicon dioxide which should be provided in producing a vtiamin supplemented foodstuff is expressed by the formula $$MS = 0.02V + 0.0001F$$

where MS is the minimum weight of silicon dioxide to be employed; V is the weight of coated vitamins; and F is the weight of foodstuff.

Thus, in a further preparative method, one can add the coated vitamin-silicon dioxide composition of this invention to the foodstuff and, if necessary, to achieve the calculated minimum, subsequently adding to the mixture such additional quantity of silicon dioxide as may be needed.

There is no maximum amount of silicon dioxide that can be employed in the compositions of the invention. Obviously, there would be no practical purpose in using amounts of silicon dioxide considerably in excess of the minimum amount required. Generally, quantities of silicon dioxide ranging from the minimum amount given by the above formula up to about ten times the minimum amount are employed.

Vitamin A-active materials that can be employed in the practice of the invention include vitamin A esters, e.g., vitamin A palmitate, vitamin A acetate, etc.

The coated vitamins disclosed above are well known to the art, e.g., B vitamins encased in a coating of a mixture of monoglycerides and diglycerides of naturally-occurring fatty acids having from 16 to 18 carbon atoms, see e.g., U.S. Patent No. 3,080,292 to Koff; niacinamide coated with naturally-occurring saturated fatty acids having from 16 to 18 carbon atoms, see, e.g., U.S. Patent No. 3,080,293 to Koff; gelatin coated vitamin A-containing compositions, see, e.g., U.S. Patent No. 2,756,177 to Cannalonga et al. Normally, from about 50 to about 80 percent of coating material is present based on the total weight of the coated vitamin product. In addition to individual coated vitamins, any multivitamin composition which includes one or more of the above-named vitamins has a coating as above can be used in the compositions of the invention.

As indicated heretofore, compositions of the invention which do not include a foodstuff can be mixed with a foodstuff to provide the foodstuff with a higher vitamin content. The amount of the instant compositions added to the foodstuffs depends on the concentration of vitamin desired. However, the incorporation of an additional quautity of silicon dioxide into the final foodstuff product may be required to provide such product with the minimum amount of silicon dioxide needed, as calculated from the aforesaid formula.

The following examples are given to illustrate the invention and are not intended to be limitative thereof.

EXAMPLE 1

A coated multivitamin beadlet mixture composed as follows:

| | |
|---|---:|
| Vitamin $B_1$—33 percent coated with a mixture of mono- and diglycerides of $C_{16}$–$C_{18}$ fatty acids [1] _____ mg | 15 |
| Vitamin $B_2$—33 percent coated with a mixture of mono- and diglycerides of $C_{16}$–$C_{18}$ fatty acids [1] _____ mg | 18 |
| Vitamin $B_6$—33 percent coated with a mixture of mono- and diglycerides of $C_{16}$–$C_{18}$ fatty acids [1] _____ mg | 7 |
| Niacinamide—33 percent coated with stearic acid [2] _____ mg | 75 |
| Iron, reduced _____ mg | 15 |
| Potassium iodide _____ mg | 0.7 |
| Vitamin A palmitate—500,000 I.U./gm.—gelatin coated [3] _____ units | 2000 |

[1] According to the process of U.S. Patent No. 3,080,292.
[2] According to the process of U.S. Patent No. 3,080,293.
[3] According to the process of U.S. Patent No. 2,756,177.

was intimately mixed with 5.0 mg. of silicon dioxide having a particle size of about 0.015 micron, a total surface area of about 190 m.²/gm., and containing about 1 percent water.

The above mixture was added to, and mixed with, 490 g. of sugar and 495 mg. of silicon dioxide having a particle size of about 0.015 micron, a total surface area of about 190 m.²/gm. and containing about 1 percent of water. The vitamin enriched sugar composition, thus obtained, was then stored in a closed container at room temperature for 4 months. At the end of this time, there was essentially no vitamin odor.

An identical sugar composition was prepared and stored as described above except that no silicon dioxide was present. After 1 week, the sugar composition had an objectionable odor.

EXAMPLE 2

50 g. of beadlets of vitamin $B_1$ (33 percent) coated with mono- and diglycerides of $C_{16}$–$C_{18}$ fatty acids, prepared according to process of U.S. Patent No. 3,080,292, are mixed in a mortar with 1.5 g. of silicon dioxide having a particle size of about 0.015 micron, a total surface area of about 190 m.²/gm., and containing about 1 per cent water. The mixture is then stored in a bottle at room temperature.

In a seperate bottle, 50 g. of the above beadlets of vitamin $B_1$ unmixed with silicon dioxide, is stored at room temperature.

After 6 months' storage, the beadlets mixed with silicon dioxide do not have an offensive odor, while the beadlets not mixed with silicon dioxide have a decidedly disagreeable odor.

We claim:

1. A composition consisting essentially of an intimate admixture of discrete particles of (a) at least one coated vitamin which tends to form an objectionable odor on storage, coated with coating material having a low water solubility, and (b) for each part by weight of said ingredient (a) from about 0.01 to about 10 parts by weight of silicon dioxide having a particle size range of from about 0.010 to about 0.040 micron, a total surface area of from about 150 to about 350 sq. meters per gram, an internal surface area of less than 20% of the total surface area, and a water content of no more than about 3%.

2. A composition according to claim 1 wherein said coated vitamin tending to form an objectionable odor on storage is selected from the group consisting of one of the B group of vitamins, vitamin A, and a vitamin A-active material.

3. A vitamin-enriched sugar product consisting essentially of (1) sugar and (2) a composition comprising discrete particles of (a) at least one coated vitamin which tends to form an objectionable odor on storage, coated with a coating material having a low water solubility and (b) silicon dioxide having a particle size range of from about 0.010 to about 0.040 micron, a total surface area of from about 150 to 350 sq. meters per gram, an internal surface area of less than 20% of the total surface area and a water content of no more than about 3%, there being present in said sugar product a sufficient quantity of ingredient (2) to provide the minimum quantity of silicon dioxide as calculated by the formula:

$$MS = 0.2\,V + 0.0001\,F$$

wherein MS is the minimum amount of silicon dioxide employed, V is the weight of coated vitamin, and F is the weight of foodstuff.

References Cited

UNITED STATES PATENTS 3,247,064  4/1966  Maekawa et al. _____ 424—34

RICHARD L. HUFF, Primary Examiner

U.S. Cl. X.R.

99—11, 141; 424—38, 252, 255, 266, 311, 312, 344, 357